United States Patent
Holmes

[19]

[11] Patent Number: 5,942,732
[45] Date of Patent: Aug. 24, 1999

[54] AUTOMATIC WEIGH AND COUNT FILLING MACHINE FEED MECHANISM

[76] Inventor: Robert Holmes, 4633 Berryman Ave., Culver City, Calif. 90230

[21] Appl. No.: 09/059,657

[22] Filed: Apr. 13, 1998

[51] Int. Cl.[6] .......................... G01G 13/02; G01G 13/04; G01G 13/00
[52] U.S. Cl. .......................... 177/119; 177/121; 222/77; 141/83
[58] Field of Search .............................. 198/568; 222/77, 222/199, 200, 55, 56; 141/83; 177/64, 116, 119, 120, 121

[56] References Cited

U.S. PATENT DOCUMENTS

| | | | |
|---|---|---|---|
| 3,938,601 | 2/1976 | Hobart | 177/1 |
| 3,944,004 | 3/1976 | Lafitte et al. | 177/1 |
| 4,945,957 | 8/1990 | Kardux et al. | 141/83 |
| 5,285,930 | 2/1994 | Nielson | 222/56 |
| 5,639,995 | 6/1997 | Mosher | 177/116 |
| 5,767,455 | 6/1998 | Mosher | 177/119 |

*Primary Examiner*—Randy W. Gibson
*Attorney, Agent, or Firm*—Beehler & Pavitt; David A. Belasco; William H. Pavitt, Jr.

[57] ABSTRACT

A final stage automatic weigh and count filling machine feed mechanism is described. The invention is a refinement for machinery used to produce standard quantities of piece parts for subsequent packaging. In general these machines use a series of vibrating feed trays to move a flow of piece parts from a bulk supply into a batching hopper that includes a weighing means. A precise weight is correlated with a part count for a given part. As the desired weight is approached, electronic signals are generated by the weighing means to regulate the speed of vibration applied to the trays or to terminate the vibration altogether. The refinement in the present invention is a trickle feed pan that is affixed to a mounting rail which extends up through an opening in a final stage bulk feed pan. The final stage bulk feed pan and trickle feed pan are mounted on separate vibratory drive mechanisms that are independently controlled. When the material received in the batching hopper approaches predetermined weight limits the speed of the first vibratory drive mechanism and the second vibratory drive mechanism are reduced from a higher speed to a lower speed or stopped altogether. By mounting the trickle feed drive mechanism in the center of the final stage bulk feed pan, excess parts from the trickle feeder drop into the bulk feeder tray. By using a separate vibratory drive mechanism, mounted only to the trickle feeder, the batching hopper can be rapidly and precisely filled. Other refinements of the present invention include special inserts for the trickle feeder pan designed to guide washers and similar parts down the feeder and reversibsle inserts for the trickle feeder pan designed to accommodate different size parts.

7 Claims, 4 Drawing Sheets

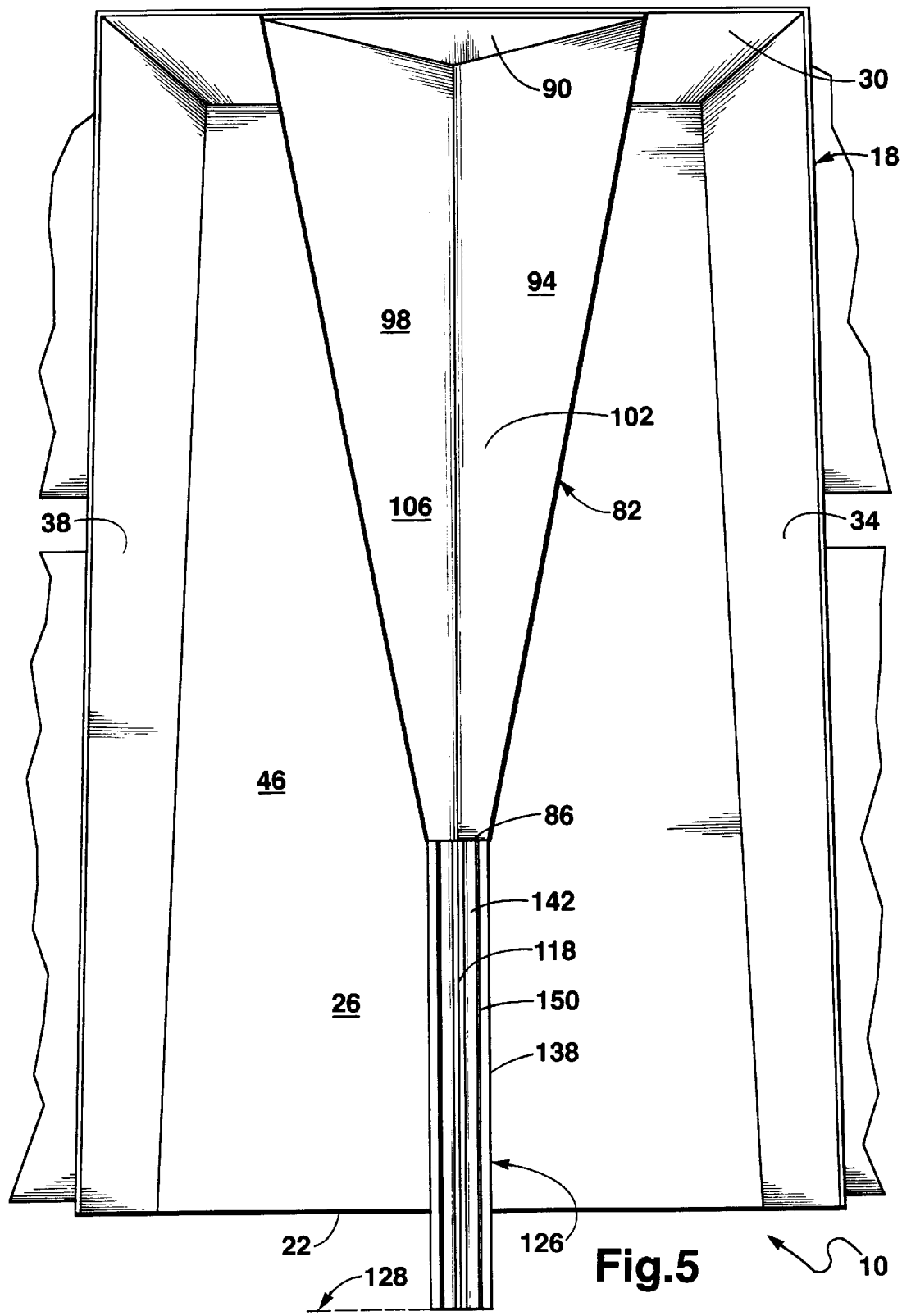

AUTOMATIC WEIGH AND COUNT FILLING MACHINE FEED MECHANISM

FIELD OF INVENTION

The invention pertains to automated package filling machines. More particularly, the invention relates to machines that employ weighing and counting methods to automatically fill containers with an accurately measured number of items.

BACKGROUND OF THE INVENTION

Various types of machines have been developed for precision package filling; incorporating a number of different technologies. U.S. Pat. No. 4,095,723 issued to Lerner incorporates a feed pan with two discharge openings leading to a batching hopper. A weighing unit monitors the weight of articles in the bucket and signals a door to close one of the openings as the weight of articles in the bucket approaches a predetermined limit. The weighing unit subsequently signals the feed pan drive to slow and finally stop its feeding action as the limit is reached.

U.S. Pat. No. 4,129,189 issued to Maglecic, controls the weights of charges of product by feeding the product at a high flow rate and then at a relatively low "dribble" flow rate into one or more receiving pans. U.S. Pat. No. 4,664,200, issued to Mikami et al utilizes a plurality of feed troughs adapted to be separately vibrated and radially arranged around the outer periphery of a dispersion table to feed articles to associated weighing units. U.S. Pat. No. 5,473,703 issued to Smith uses a photoelectric counting means to vary the speed of the vibratory feed mechanism as does U.S. Pat. No. 5,671,262 issued to Boyer et al.

While other variations exist, the above described designs for package filling machines are typical of those encountered in the prior art. It is an objective of the present invention to provide for precision filling of packages with parts or material of various sizes and configurations. It is a further objective to provide such precision filling at commercially realistic speeds. It is a still further objective of the invention to provide the above described capabilities in an inexpensive and durable machine which is capable of extended duty cycles and that may be easily repaired and maintained. It is yet a further objective to permit the weighing and counting of parts having specialized shapes and sizes.

While some of the objectives of the present invention are disclosed in the prior art, none of the inventions found include all of the requirements identified.

SUMMARY OF THE INVENTION

The present invention addresses all of the deficiencies of prior art weighing and counting inventions and satisfies all of the objectives described above.

A final stage automatic weigh and count filling machine feed mechanism providing the desired features may be constructed from the following components secured to a horizontal mounting surface. A final stage bulk feed pan having a front edge, a base, and having a back wall, a first outer side wall, a second outer side wall, the walls extending upwardly from the base for at least a first predetermined distance. The base has an upper surface, a lower surface and an opening having a first side and a second side. The opening is disposed between and spaced from each of the first outer side wall and the second outer side wall and extends from the front edge to within a second predetermined distance of the back wall. The base includes a first inner side wall and a second inner side wall. The first inner side wall extends upwardly from the base adjacent the first side of the opening for a third predetermined distance. The second inner side wall extends upwardly from the base adjacent the second side of the opening for the same third predetermined distance. The third predetermined distance is less than the first predetermined distance.

A first vibratory drive mechanism adapted to vibrate between a first position and a second position is fixedly attached to the mounting surface and fixedly attached to the lower surface of the base of the final stage bulk feed pan. The first vibratory drive mechanism has at least two operating speeds.

A trickle feed pan having a front edge, a back wall and a pair of sides defining a v-shaped conduit extending from the back wall to the front edge. The v-shaped conduit has an upper surface and a lower surface. A mounting rail having an upper end and a lower end is fixedly secured to the lower surface of the v-shaped conduit at the upper end. The mounting rail is sized to fit closely within the opening in the final stage bulk feed pan and extends through the opening.

A feeding trough is fixedly attached to the upper end of the mounting rail and extends from the front edge of the trickle feed pan to a point beyond the front edge of the final stage bulk feed pan. A second vibratory drive mechanism adapted to vibrate between a first position and a second position is fixedly attached to the mounting surface and fixedly attached to the lower end of the mounting rail. This attachment positions the trickle feed pan within the final stage bulk feed pan between the first outer side wall and the second outer side wall. The second vibratory drive mechanism has at least two operating speeds.

A batching hopper is located adjacent to and below the front edge of the final stage bulk feed pan. The batching hopper including a weight measuring means.

A means responsive to the amount of weight detected by the weight measuring means is adapted to control the speed of the first vibratory drive mechanism and the speed of the second vibratory drive mechanism. In operation, when the material received in the batching hopper approaches a first predetermined weight limit the speed of the first vibratory drive mechanism is reduced from a higher speed to a lower speed. When the material received in the batching hopper approaches a second predetermined weight limit the first vibratory drive mechanism is stopped. When the material received in the batching hopper approaches a third predetermined weight limit the speed of the second vibratory drive mechanism is reduced from a higher speed to a lower speed. Finally, when the material received in the batching hopper approaches a final predetermined weight limit the second vibratory drive mechanism is stopped.

In one variation of the invention the weight measuring means includes an electronic strain gauge and amplification circuitry to produce signals for controlling the first vibratory drive mechanism and the second vibratory drive mechanism.

In another variation of the invention the weight measuring means includes a load cell and amplification circuitry to produce signals for controlling the first vibratory drive mechanism and the second vibratory drive mechanism.

The means for controlling the first vibratory drive mechanism and the second vibratory drive mechanism includes logic circuits designed to control the activation and speed of the first and second vibratory drive mechanisms based on signals from the weight measuring means.

In still another variation of the invention, the feeding trough further comprises a readily demountable, reversible x-shaped insert. The insert has an upper surface and a lower surface and has a first sized v-shaped trough on the upper surface and a second, larger v-shaped trough on the lower surface.

In yet another variation of the invention the feeding trough further comprises a replacement feeding trough insert adapted for feeding flat, circular materials such as washers. The washer-feeding trough insert is w-shaped in cross-section and has a pair of inner lateral surfaces, a pair of outer lateral surfaces, a front end and a rear end. The inner lateral surfaces serve to direct washers to either of the outer lateral surfaces. The outer lateral surfaces serve to constrain the washers within the feeding trough insert.

The outer lateral surfaces have a first width at the rear end and a second, smaller width at the front end. The washer-feeding trough insert is positioned adjacent to the front edge of the trickle feed pan and extends for a predetermined distance to a point past the front edge of the final stage bulk feed pan.

An appreciation of the other aims and objectives of the present invention and an understanding of it may be achieved by referring to the accompanying drawings and the detailed description of a preferred embodiment.

DESCRIPTION OF THE DRAWINGS

FIG. 5 is a plan view of the FIG. 1 embodiment.

DETAILED DESCRIPTION OF THE PREFERRED EMBODIMENT

Figure 1:
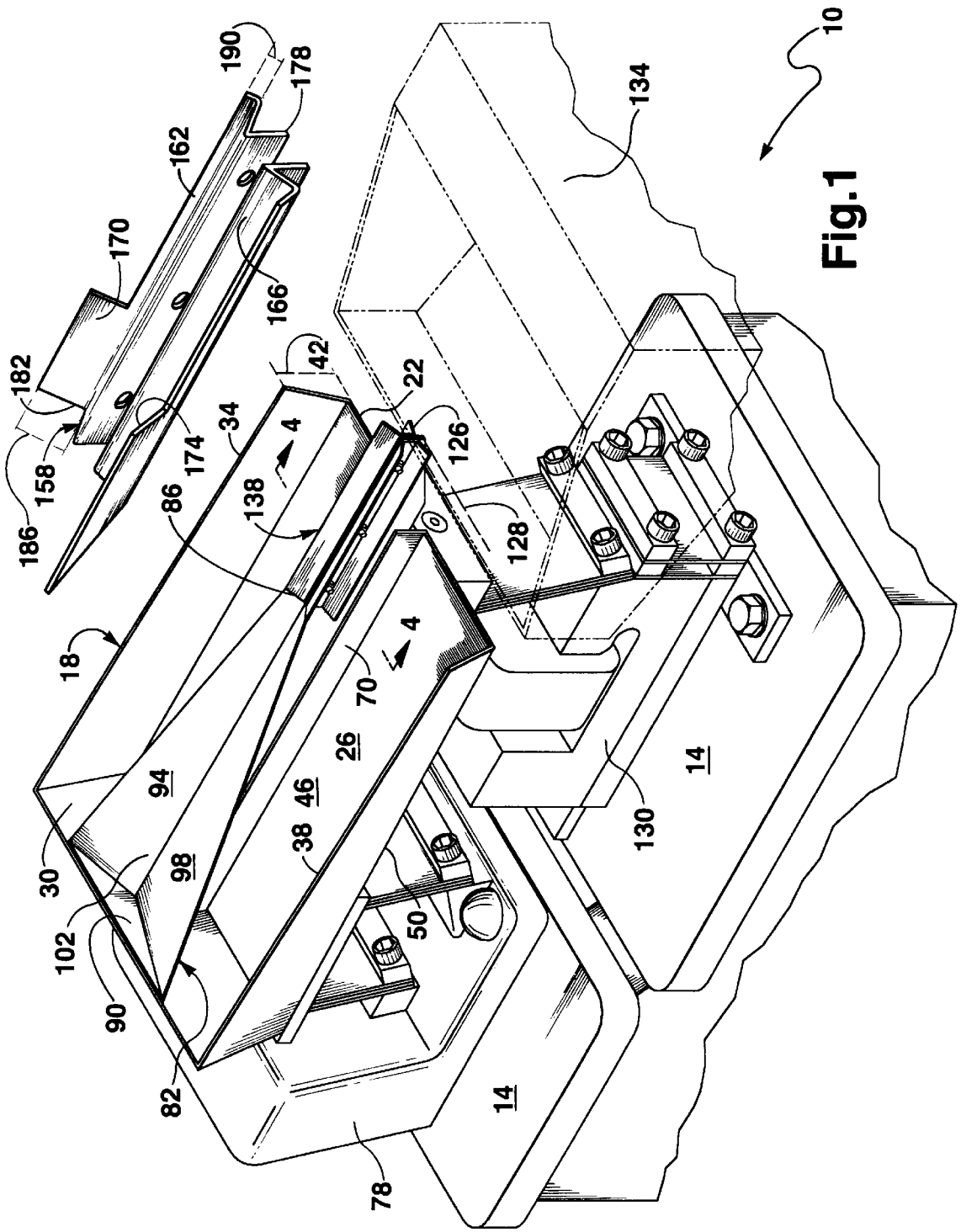
FIG. 1 is a perspective view of the preferred embodiment of the invention including an enlarged illustration of the optional washer-feeding trough insert.
Figure 2:
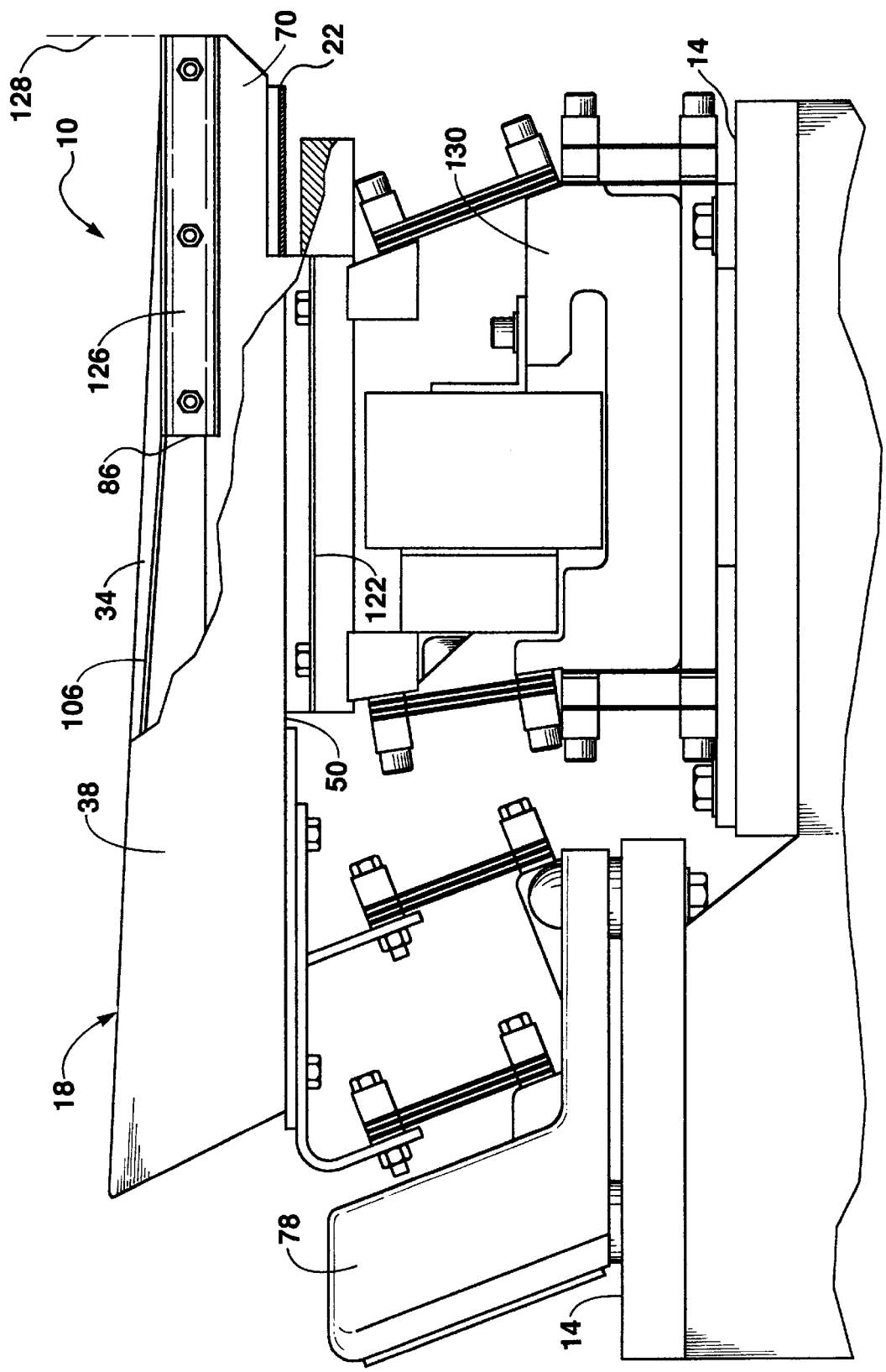
FIG. 2 is a side elevation of the FIG. 1 embodiment.
Figure 3:
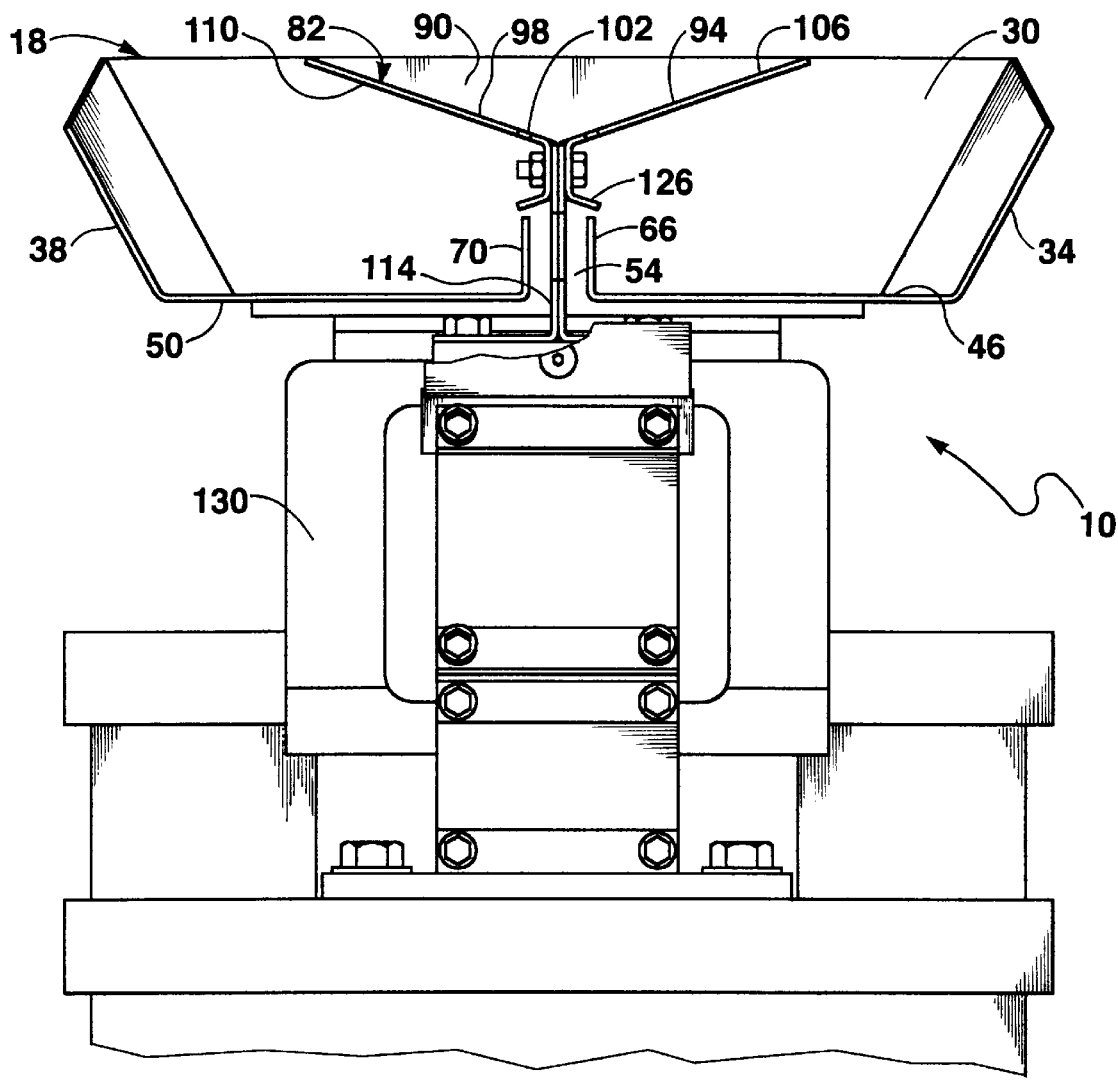
FIG. 3 is a front elevation of the FIG. 1 embodiment.

FIGS. 1–5 illustrate a final stage automatic weigh and count filling machine feed mechanism 10 secured to a horizontal mounting surface 14. The mechanism 10 includes a final stage bulk feed pan 18 having a front edge 22, a base 26, a back wall 30, a first outer side wall 34 and a second outer side wall 38, the walls 30, 34 and 38 extending upwardly from the base 26 for at least a first predetermined distance 42.

The base 26 has an upper surface 46, a lower surface 50 and an opening 54 having a first side 58 and a second side 62. The opening 54 is disposed between and spaced from each of the first outer side wall 34 and the second outer side wall 38 and extends from the front edge 22 to within a second predetermined distance of the back wall 30. The base 26 includes a first inner side wall 66 and a second inner side wall 70. The first inner side wall 66 extends upwardly from the base 26 adjacent the first side 58 of the opening 54 for a third predetermined distance 74. The second inner side wall 70 extends upwardly from the base 26 adjacent the second side 62 of the opening 54 for the same third predetermined distance 74. The third predetermined distance 74 is less than the first predetermined distance 42.

A first vibratory drive mechanism 78 adapted to vibrate between a first position and a second position is fixedly attached to the mounting surface 14 and fixedly attached to the lower surface 50 of the base 26 of the final stage bulk feed pan 18. The first vibratory drive mechanism 78 has at least two operating speeds.

Figure 4:
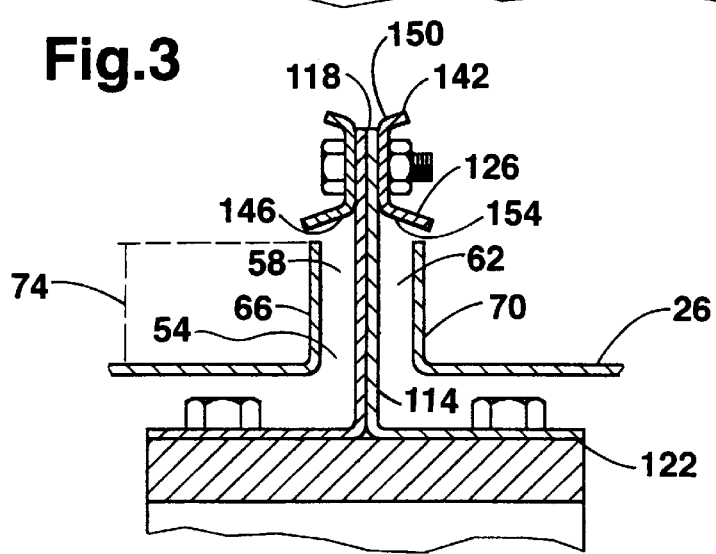
FIG. 4 is a cross-sectional view of the FIG. 1 embodiment taken along the line 4—4.

A trickle feed pan 82 having a front edge 86, a back wall 90 and a pair of sides 94, 98 defining a v-shaped conduit 102 extending from the back wall 90 to the front edge 86. The v-shaped conduit 102 has an upper surface 106 and a lower surface 110. As illustrated in FIGS. 4 and 5, a mounting rail 114 having an upper end 118 and a lower end 122 is fixedly secured to the lower surface 110 of the v-shaped conduit 102 at the upper end 118. The mounting rail 114 is sized to fit closely within the opening 54 in the final stage bulk feed pan 18 and extends through the opening 54.

As shown in FIGS. 1–5, a feeding trough 126 is fixedly attached to the upper end 118 of the mounting rail 114 and extends from the front edge 86 of the trickle feed pan 82 to a point 128 beyond the front edge 22 of the final stage bulk feed pan 18. A second vibratory drive mechanism 130 adapted to vibrate between a first position and a second position is fixedly attached to the mounting surface 14 and fixedly attached to the lower end 122 of the mounting rail 114. This attachment positions the trickle feed pan 82 within the final stage bulk feed pan 18 between the first outer side wall 34 and the second outer side wall 38. The second vibratory drive mechanism 130 has at least two operating speeds.

A batching hopper 134 is located adjacent to and below the front edge 22 of the final stage bulk feed pan 18. The batching hopper 134 including a weight measuring means.

A means responsive to the amount of weight detected by the weight measuring means is adapted to control the speed of the first vibratory drive mechanism 78 and the speed of the second vibratory drive mechanism 130. In operation, when the material received in the batching hopper 134 approaches a first predetermined weight limit the speed of the first vibratory drive mechanism 78 is reduced from a higher speed to a lower speed. When the material received in the batching hopper 134 approaches a second predetermined weight limit the first vibratory drive mechanism 78 is stopped. When the material received in the batching hopper 134 approaches a third predetermined weight limit the speed of the second vibratory drive mechanism 130 is reduced from a higher speed to a lower speed. Finally, when the material received in the batching hopper approaches a final predetermined weight limit the second vibratory drive mechanism 130 is stopped.

In one variation of the invention the weight measuring means includes an electronic strain gauge and amplification circuitry to produce signals for controlling the first vibratory drive mechanism 78 and the second vibratory drive mechanism 130.

In another variation of the invention the weight measuring means includes a load cell and amplification circuitry to produce signals for controlling the first vibratory drive mechanism 78 and the second vibratory drive mechanism 130.

The means for controlling the first vibratory drive mechanism 78 and the second vibratory drive mechanism 130 includes logic circuits designed to control the activation and speed of the first vibratory drive mechanism 78 and second vibratory drive mechanism 130 based on signals from the weight measuring means.

In still another variation of the invention, the feeding trough 126 further comprises a readily demountable, reversible x-shaped insert 138 as shown in FIGS. 1, 4 and 5. The insert 138 has an upper surface 142 and a lower surface 146 and has a first sized v-shaped trough 150 on the upper surface and a second, larger v-shaped trough 154 on the lower surface 146.

In yet another variation of the invention, shown in FIG. 1, the feeding trough 126 further comprises a replacement feeding trough insert 158 adapted for feeding flat, circular materials such as washers. The washer-feeding trough insert 158 is w-shaped in cross-section and has a pair of inner lateral surfaces 162, 166, a pair of outer lateral surfaces 170, 174, a front end 178 and a rear end 182. The inner lateral surfaces 162, 166, serve to direct washers to either of the outer lateral surfaces 170, 174. The outer lateral surfaces 170, 174 serve to constrain the washers within the feeding trough insert 158.

The outer lateral surfaces 170, 174 have a first width 186 at the rear end 182 and a second, smaller width 190 at the front end 178. The washer-feeding trough insert 158 is positioned adjacent to the front edge 86 of the trickle feed pan 82 and extends for a predetermined distance to a point 126 past the front edge 22 of the final stage bulk feed pan 18.

The final stage automatic weigh and count filling machine feed mechanism 10 has been described with reference to particular embodiments. Other modifications and enhancements can be made without departing from the spirit and scope of the claims that follow.

I claim:

1. A final stage automatic weigh and count filling machine feed mechanism, comprising:

a horizontal mounting surface;

a final stage bulk feed pan having a closed end and an open end;

a first vibratory drive mechanism fixedly attached to the mounting surface and fixedly mounted to the final stage bulk feed pan;

said first vibratory drive mechanism being capable of at least one speed and being adapted to vibrate between a first position and a second position;

a second vibratory drive mechanism adapted to vibrate between a first position and a second position and being fixedly attached to the mounting surface;

said second vibratory drive mechanism being capable of at least one speed;

a trickle feed pan, having a closed end and an open end, and being fixedly mounted to the second vibratory drive mechanism and being disposed within the final stage bulk feed pan;

a v-shaped feeding trough fixedly attached adjacent the open end of the trickle feed pan and extending beyond the open end of the final stage bulk feed pan;

an batching hopper disposed adjacent and below the open end of the final stage bulk feed pan;

said batching hopper including a weight measuring means; and a means responsive to the amount of weight detected by the weight measuring means adapted to control the speed of the first vibratory drive mechanism and the speed of the second vibratory drive mechanism.

2. A final stage automatic weigh and count filling machine feed mechanism, comprising:

a horizontal mounting surface;

a final stage bulk feed pan, said pan having a front edge, a base, and having a back wall, a first outer side wall, a second outer side wall, said walls extending upwardly from said base for at least a first predetermined distance;

said base having an upper surface, a lower surface and an opening, said opening having a first side and a second side and being disposed between and spaced from each of the first outer side wall and the second outer side wall and extending from the front edge to within a second predetermined distance of the back wall;

said base including a first inner side wall and a second inner side wall;

said first inner side wall extending upwardly from the base adjacent the first side of the opening for a third predetermined distance;

said second inner side wall extending upwardly from the base adjacent the second side of the opening for the third predetermined distance;

said third predetermined distance being less than the first predetermined distance;

a first vibratory drive mechanism adapted to vibrate between a first position and a second position and being fixedly attached to the mounting surface and fixedly attached to the lower surface of the base of the final stage bulk feed pan;

said first vibratory drive mechanism having at least two operating speeds;

a trickle feed pan, said pan having a front edge, a back wall and a pair of sides defining a v-shaped conduit extending from the back wall to the front edge;

said v-shaped conduit having an upper surface and a lower surface;

a mounting rail, said mounting rail having an upper end and a lower end, and being fixedly secured to the lower surface of the v-shaped conduit at the upper end;

said mounting rail being sized to fit closely within the opening in the final stage bulk feed pan and extending through the opening;

a feeding trough fixedly attached to the upper end of the mounting rail and extending from the front edge of the trickle feed pan to a point beyond the front edge of the final stage bulk feed pan;

a second vibratory drive mechanism adapted to vibrate between a first position and a second position and being fixedly attached to the mounting surface and fixedly attached to the lower end of the mounting rail, thereby positioning the trickle feed pan within the final stage bulk feed pan between the first outer side wall and the second outer side wall;

said second vibratory drive mechanism having at least two operating speeds;

an batching hopper disposed adjacent and below the front edge of the final stage bulk feed pan;

said batching hopper including a weight measuring means;

a means responsive to the amount of weight detected by the weight measuring means adapted to control the speed of the first vibratory drive mechanism and the speed of the second vibratory drive mechanism; and when the material received in the batching hopper approaches a first predetermined weight limit the speed of the first vibratory drive mechanism is reduced from a higher speed to a lower speed, and when the material received in the batching hopper approaches a second predetermined weight limit the first vibratory drive mechanism is stopped, and when the material received in the batching hopper approaches a third predetermined weight limit the speed of the second vibratory drive mechanism is reduced from a higher speed to a lower speed, and when the material received in the batching hopper approaches a final predetermined weight limit the second vibratory drive mechanism is stopped.

3. A final stage automatic weigh and count filling machine feed mechanism as described in claim 2, wherein the weight measuring means includes an electronic strain gauge and amplification circuitry to produce signals for controlling the first vibratory drive mechanism and the second vibratory drive mechanism.

4. A final stage automatic weigh and count filling machine feed mechanism as described in claim 2, wherein the weight measuring means includes a load cell and amplification circuitry to produce signals for controlling the first vibratory drive mechanism and the second vibratory drive mechanism.

5. A final stage automatic weigh and count filling machine feed mechanism as described in claim 2, wherein the means for controlling the first vibratory drive mechanism and the second vibratory drive mechanism includes logic circuits designed to control the activation and speed of the first and second vibratory drive mechanisms based on signals from the weight measuring means.

6. A final stage automatic weigh and count filling machine feed mechanism as described in claim 2, wherein the feeding trough further comprises:

a readily demountable, reversible x-shaped insert, said insert having an upper surface and a lower surface; and said x-shaped insert having a first sized v-shaped trough on the upper surface and a second, larger v-shaped trough on the lower surface.

7. A final stage automatic weigh and count filling machine feed mechanism as described in claim 2, wherein the feeding trough further comprises:

a replacement feeding trough insert adapted for feeding flat, circular materials such as washers;

said washer-feeding trough insert being w-shaped in cross-section and having a pair of inner lateral surfaces, a pair of outer lateral surfaces, a front end and a rear end;

said inner lateral surfaces serving to direct washers to either of the outer lateral surfaces;

said outer lateral surfaces serving to constrain the washers within the feeding trough insert;

said outer lateral surfaces having a first width at the rear end and a second, smaller width at the font end; and said washer-feeding trough insert being positioned adjacent the front edge of the trickle feed pan and extending for a predetermined distance to a point past the front edge of the final stage bulk feed pan.

* * * * *